US008199435B2

United States Patent
Fong et al.

(10) Patent No.: US 8,199,435 B2
(45) Date of Patent: Jun. 12, 2012

(54) APPARATUS FOR RETAINING LUBRICANT ON THE DEPOSITED END OF A SLIDER IN A HARD DISK DRIVE

(75) Inventors: Walton Fong, San Jose, CA (US); Brian Thornton, Mountain View, CA (US)

(73) Assignee: Seagate Technology International

( * ) Notice: Subject to any disclaimer, the term of this patent is extended or adjusted under 35 U.S.C. 154(b) by 614 days.

(21) Appl. No.: 12/349,464

(22) Filed: Jan. 6, 2009

(65) Prior Publication Data

US 2010/0172056 A1  Jul. 8, 2010

(51) Int. Cl.
*G11B 15/64* (2006.01)

(52) U.S. Cl. .................. 360/234.4; 360/244; 360/236.6; 360/235.7; 360/236.3; 360/236.5

(58) Field of Classification Search ............... 360/234.4, 360/236.6, 235.7, 236.3, 236.5; 365/234.4, 365/236.6, 235.7, 236.3, 236.5, 244
See application file for complete search history.

(56) References Cited

U.S. PATENT DOCUMENTS

| 7,227,723 B2 * | 6/2007 | Nath et al. ................. 360/235.7 |
| 7,465,095 B2 * | 12/2008 | Agari et al. ..................... 384/45 |
| 2008/0130173 A1 * | 6/2008 | Park ........................... 360/236.6 |

* cited by examiner

*Primary Examiner* — Connie Yoha

(57) ABSTRACT

This application discloses a hard disk drive, a head stack assembly, a head gimbal assembly, each including a slider with a deposited end including at least one means for retaining lubricant that tends to accumulate on the deposited end.

22 Claims, 4 Drawing Sheets

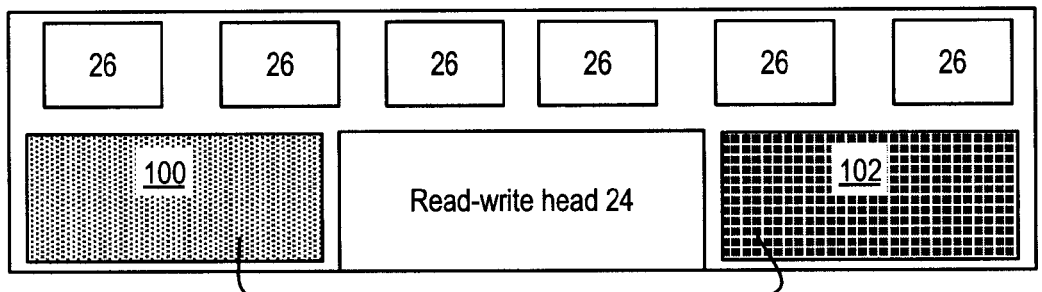
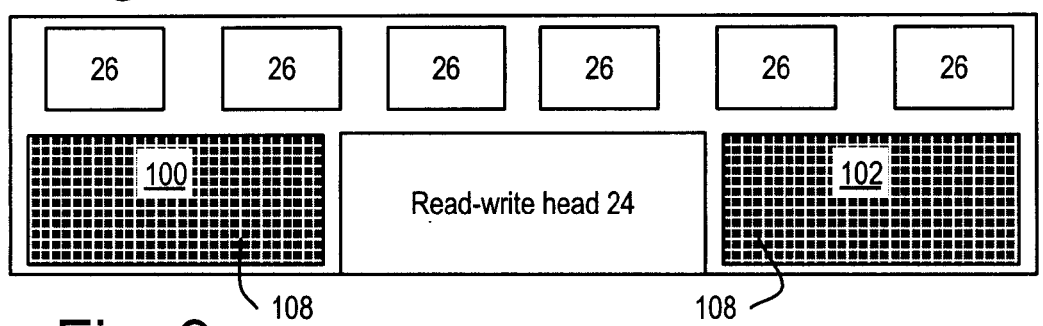
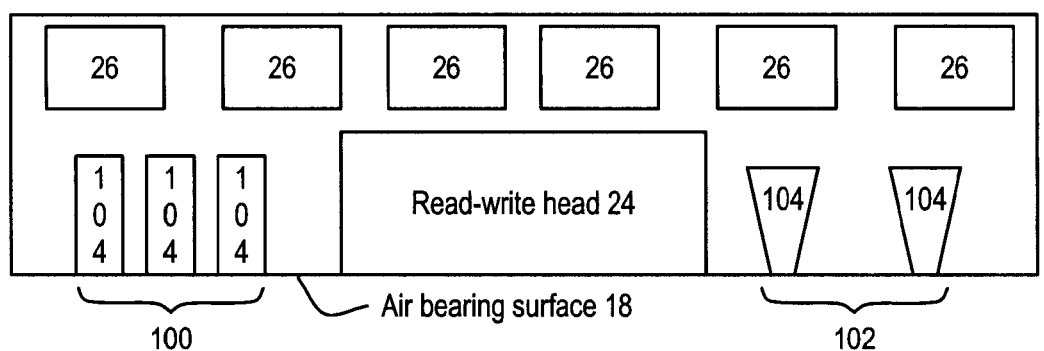
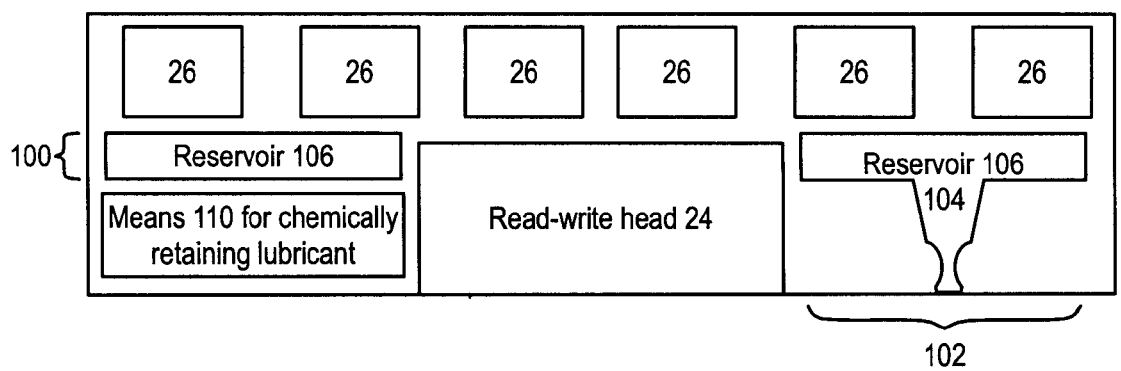

APPARATUS FOR RETAINING LUBRICANT ON THE DEPOSITED END OF A SLIDER IN A HARD DISK DRIVE

TECHNICAL FIELD

This invention relates to the handling of lubricant on or near a slider in a hard disk drive.

BACKGROUND OF THE INVENTION

Over the last several years, the memory capacity of hard disk drives has greatly increased and with it, the flying height of the sliders over rotating disk surfaces has decreased, to where their read-write heads are often less than ten nanometers off the rotating disk surface when accessing data. Lubricants used in the vicinity of the rotating disk surfaces can accumulate on the slider and fall back onto the disk surface sometimes degrading the performance of the read-write heads.

SUMMARY OF THE INVENTION

Embodiments of the invention include a hard disk drive comprising a disk base, a spindle motor mounted on the disk base for rotating at least one disk to create at least one rotating disk surface, and a head stack assembly pivotably coupled to the disk base for positioning at least one slider over the rotating disk surface. The slider has a deposited end including a read-write head and at least one means for retaining lubricant accumulating on the deposited end, in order to reduce the chance of the lubricant disrupting the slider and/or the disk surface.

The deposited end may further include at least one of means for retaining the lubricant to the left and/or to the right of the read-write head. At least one these means may include a means for chemically retaining the lubricant and/or for mechanically retaining the lubricant. The means for mechanically retaining the lubricant may further include a texture and/or at least one channel from the air bearing surface of the slider and/or at least one reservoir. More than one channel may connect to a reservoir. The channels may be rectangular, polygonal or curved in outline. The slider may include only a first means on the left or only a second means on the right of the read-write head. Alternatively, the slider may include different mechanical and/or chemical embodiments in the first means compared to the second means.

Other embodiments of the invention include the head stack assembly containing a head gimbal assembly including the slider, the head gimbal assembly, and the slider itself.

BRIEF DESCRIPTION OF THE DRAWINGS

And FIGS. 4 to 10 show some examples of the slider with its deposited end including various means for retaining the lubricant that do not permit the lubricant to fall back to the rotating disk surface and show some of the claimed variations in these means between the left side and the right side of the read-write head as shown in these Figures. The means may include different means to the right and left of the read-write head as shown in FIGS. 6, 7, 9 and 10. The means may include means for mechanically and/or chemically retaining the lubricant. The means for mechanically retaining lubricant may include at least one texture as shown in FIGS. 7 and 8, channels as shown in FIGS. 9 and 10, and/or reservoirs as shown in FIG. 10.

DETAILED DESCRIPTION

This invention relates to the handling of lubricant on or near a slider in a hard disk drive. Embodiments of the invention include a hard disk drive comprising a disk base, a spindle motor mounted on the disk base and to rotate at least one disk to create at least one rotating disk surface, and a head stack assembly pivotably coupled to the disk base to position at least one slider over the rotating disk surface. The slider includes a deposited end including at least one means for retaining lubricant accumulating on the deposited end, minimizing the chance that the lubricant disrupts the operations of the slider.

Figure 1:
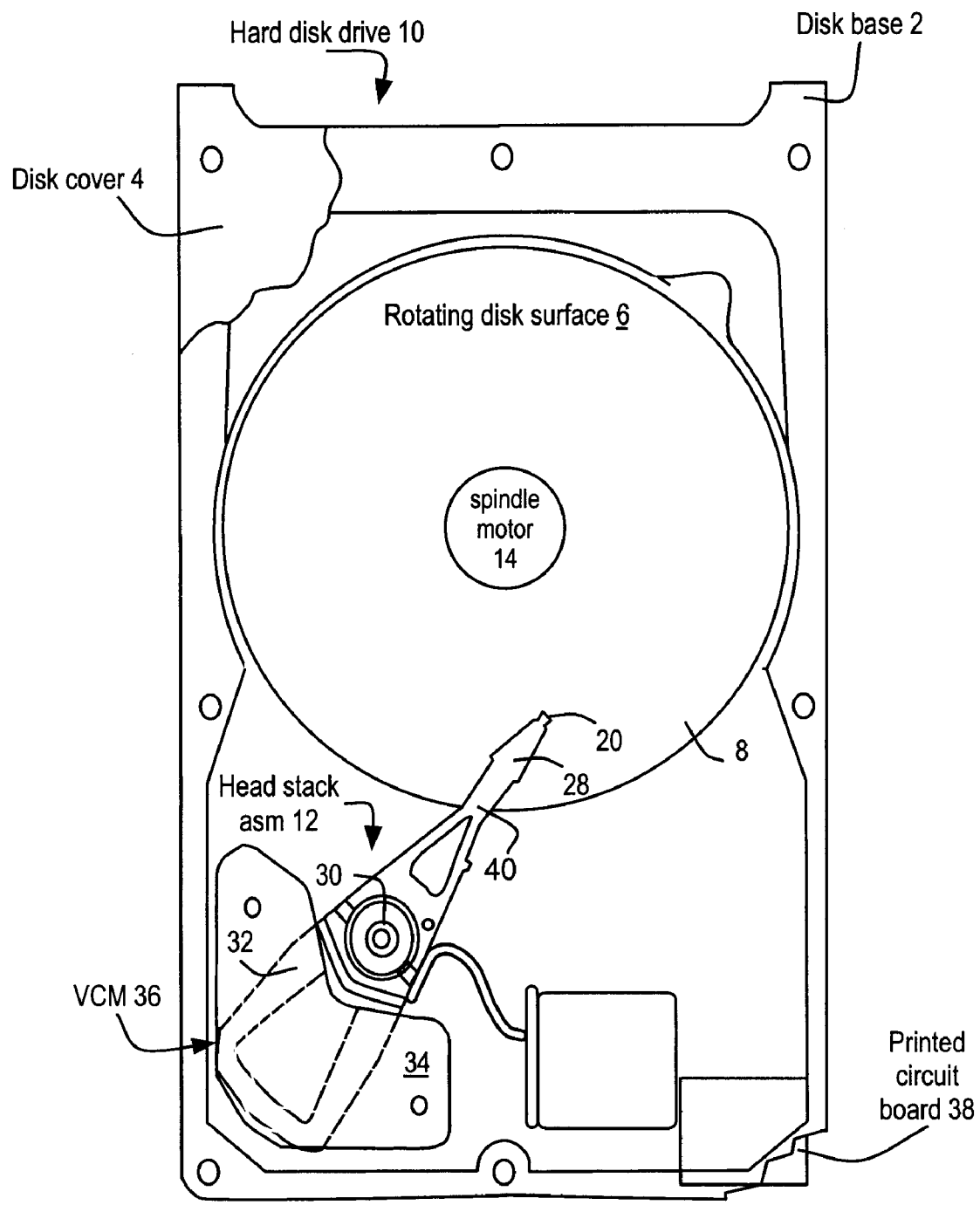
FIG. 1 shows an example of an embodiment of the invention as a hard disk drive including a disk base to which a spindle motor is mounted with at least one disk rotatably coupled to the spindle motor to create a rotating disk surface. A voice coil motor includes a head stack assembly pivotably mounted by an actuator pivot to the disk base, responsive to its voice coil interacting with a fixed magnetic assembly mounted on the disk base and may include a head gimbal assembly with or without a micro-actuator hinge configured to position at least one slider to access data stored on the rotating disk surface. The hard disk drive includes an assembled circuit board also mounted on the disk base opposite the spindle motor and the voice coil motor.

Referring to the drawings more particularly by reference numbers, FIG. 1 shows an example of an embodiment of the invention as a hard disk drive 10 including a disk base 2 to which a spindle motor 14 is mounted with at least one disk 8 rotatably coupled to the spindle motor to create a rotating disk surface 6. A voice coil motor 36 includes a head stack assembly 12 pivotably mounted by an actuator pivot 30 to the disk base, responsive to its voice coil 32 interacting with a fixed magnetic assembly 34 mounted on the disk base and including a head gimbal assembly 28 configured to position at least one slider 20 to access data stored on the rotating disk surface. The hard disk drive includes an assembled circuit board 38 also mounted on the disk base opposite the spindle motor and the voice coil motor. A disk cover 4 is mounted on the disk base to encapsulate all of the shown components except the assembled circuit board.

The hard disk drive 10 preferably accesses the data arranged in tracks on the rotating disk surface 6 by controlling the spindle motor 14 to rotate the disks 8 at a preferred rate. The data may be organized as tracks that may be configured as concentric circles or as a tightly packed spiral. The voice coil motor 36 operates by stimulating the voice coil 32 with a time varying electrical signal to magnetically interact with the fixed magnet assembly 34 causing the head stack assembly 12 to pivot about the actuator pivot 30 moving the head gimbal assembly 28 to position the slider 20 near the track on the rotating disk surface. In many embodiments, a micro-actuator assembly preferably coupled to the slider may be further stimulated to further control the position of the slider. A vertical micro-actuator either in the micro-actuator assembly, or preferably in the slider, may be stimulated to alter the flying height of the slider over the rotating disk surface.

Figure 2B:
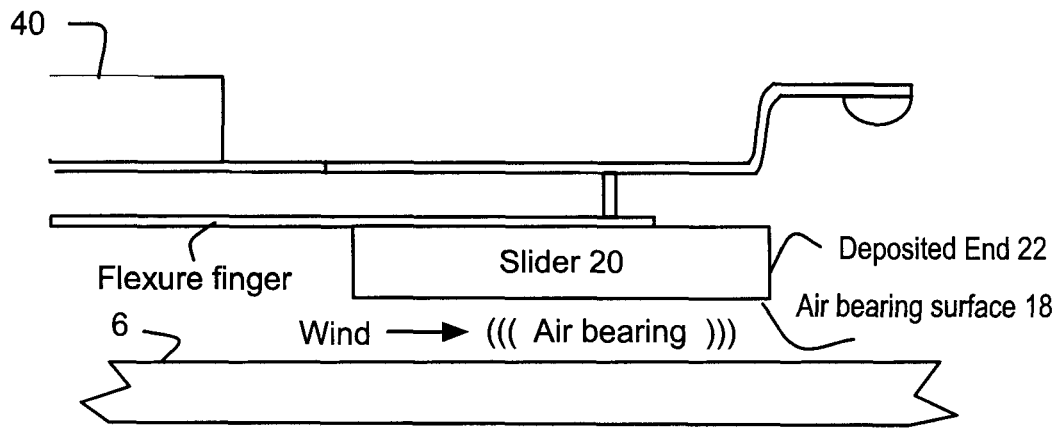
FIG. 2B shows a side view of some details of a head gimbal assembly of the previous Figures.
Figure 2A:
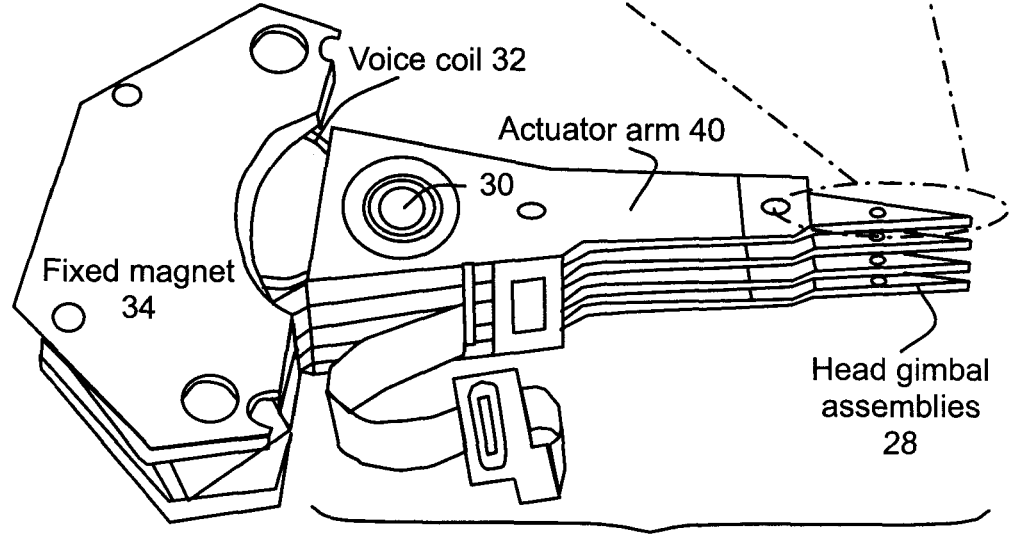
FIG. 2A shows a perspective view of the voice coil motor, its head stack assembly and the one or more head gimbal assemblies coupled to the one or more actuator arms of FIG. 1.

FIG. 2A shows a perspective view of the voice coil motor 36, its head stack assembly 12 and the one or more head gimbal assemblies 28 coupled to the one or more actuator arms 40 of FIG. 1. The head stack assembly is configured to pivot about the actuator pivot 30.

FIG. 2B shows a side view of some details of a head gimbal assembly 28 of the previous Figures, in particular the head gimbal assembly couples the actuator arm 40 to the slider 20 to aid in positioning the slider over the rotating disk surface 6. The slider includes an air bearing surface 18 configured to face the rotating disk surface 6 while the slider is accessing data and a deposited end 22 sometimes also known as the trailing edge.

The slider 20 may use a perpendicular or longitudinal recording approach to accessing data on the rotating disk surface and may employ a magneto-resistive effect or a tunneling effect to read the data. The slider may include a vertical and/or horizontal micro-actuator or the flexure finger may include a vertical and/or horizontal micro-actuator. Either approach to vertical and/or horizontal micro-actuation may employ a thermal-mechanical effect, a piezoelectric effect, and/or an electro-static effect.

Figure 3:
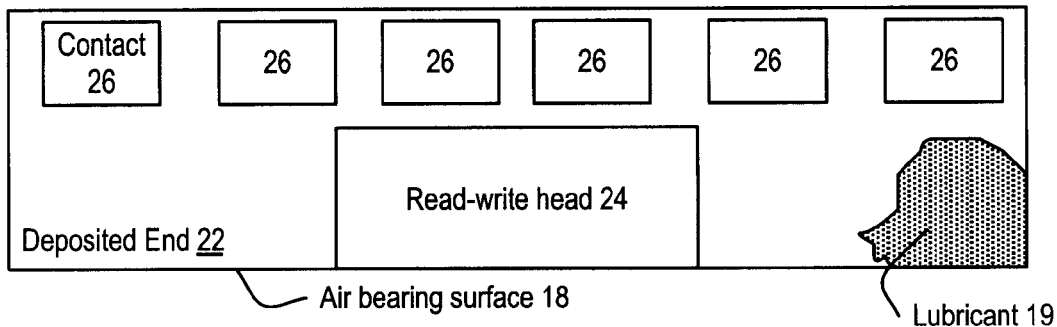
FIG. 3 shows an example of a prior art slider and its deposited end, showing multiple contacts, a read-write head and lubricant accumulating on the deposited end. As the lubricant accumulates it can fall back to the disk surface, possibly disrupting the overall performance of the hard disk drive.

FIG. 3 shows an example of a prior art slider 20 and its deposited end 22, showing multiple contacts 26 a read-write head 24 and lubricant 19 accumulating on the deposited end. As the lubricant accumulates it can fall back to the disk surface 6 and possibly disrupt the overall performance of the hard disk drive 10.

FIGS. 4 to 10 show some examples of the slider 20 with its deposited end 22 including various means for retaining the lubricant 19 that tend to inhibit the lubricant from falling back to the rotating disk surface and show some of the claimed variations in these means between the left side and the right side of the read-write head 24.

Figure 4:
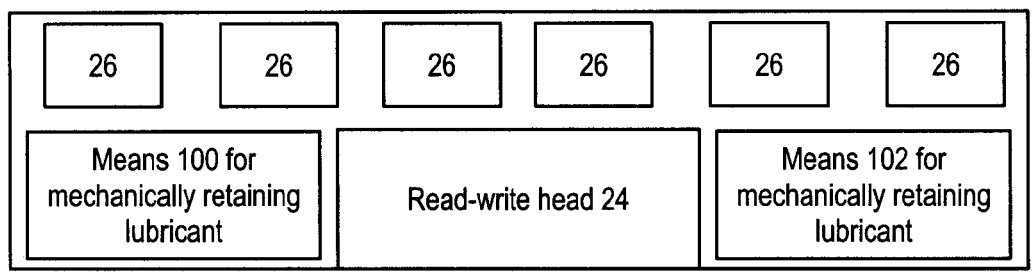

FIG. 4 shows the slider 20 with its deposited end 22 including a first means 100 for mechanically retaining the lubricant 19 to the left of the read-write head 24 and a second means 102 for mechanically retaining the lubricant to the read-write head.

Figure 5:
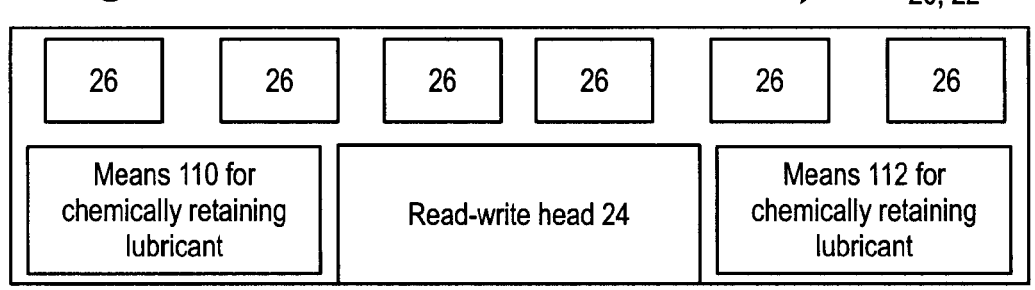

FIG. 5 shows the slider 20 with its deposited end 22 including a first means 110 for chemically retaining the lubricant 19 to the left of the read-write head 24 and a second means 112 for chemically retaining the lubricant to the read-write head.

Figure 6:
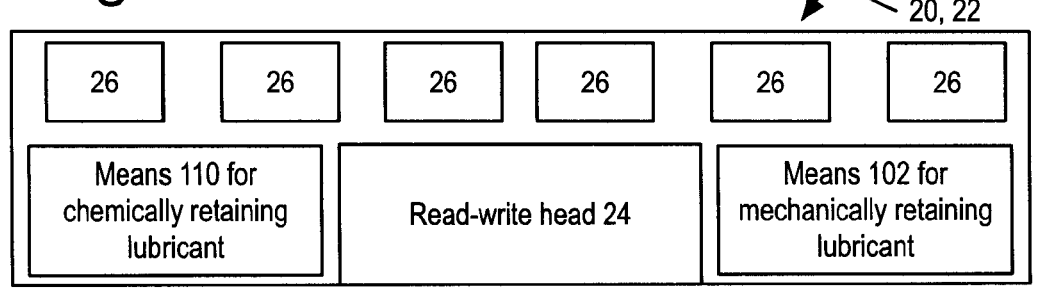

FIG. 6 shows the slider 20 with its deposited end 22 including the first means 110 for chemically retaining the lubricant 19 to the left of the read-write head 24 and the second means 102 for mechanically retaining the lubricant to the read-write head.

FIGS. 7 and 8 show the first means 100 and the second means 102 for mechanically retaining the lubricant 19 to each include at least one texture 108. FIG. 7 shows the two means including different textures and FIG. 8 shows them including essentially the same texture.

FIG. 9 shows the first means 100 and the second means 102 for mechanically retaining the lubricant 19 including at least one channel 104 from the air bearing surface 18. The channels in the first means 100 on the left side of the read-write head are essentially rectangular. And the channels included in the second means 102 are not rectangular, but are instead polygonal.

FIG. 10 shows the first means 100 for mechanically retaining the lubricant 19 including a reservoir 106, as well as a first means 110 for chemically retaining the lubricant to the left of the read-write head 24 and the second means 102 for mechanically retaining the lubricant including another reservoir merged with a channel 104 that is not polygonal, much less rectangular.

The manufacture of the slider 20 may include adding and/or altering steps to create the chemical means 110 and/or 112 on the deposited end 22. Alternatively, steps may be added and/or modified to create the mechanical means 100 and/or 102, which may further possibly create channels 104 and/or reservoirs and/or textures 108.

The preceding embodiments provide examples of the invention, and are not meant to constrain the scope of the following claims.

What is claimed is:

1. A hard disk drive, comprising:
    a disk base;
    a spindle motor mounted on said disk base and rotatably coupled to at least one disk to create at least one rotating disk surface; and
    a head stack assembly pivotably mounted to said disk base to position at least one slider over said rotating disk surface,
    with said slider comprising a deposited end including at least one means for retaining lubricant accumulating on said deposited end.

2. The hard disk drive of claim 1, wherein said deposited end further includes at least one member of the group consisting of:
    at least one of a first means for retaining said lubricant to the left of a read-write head; and
    at least one of a second means for retaining said lubricant to the right of said read-write head.

3. The hard disk drive of claim 2, wherein at least one member of said group includes a means for chemically retaining said lubricant.

4. The hard disk drive of claim 2, wherein at least one member of said group includes a means for mechanically retaining said lubricant.

5. The hard disk drive of claim 4, wherein said means for mechanically retaining comprises a texture.

6. The hard disk drive of claim 4, wherein said means for mechanically retaining comprises at least one channel from an air bearing surface of said slider.

7. The hard disk drive of claim 4, wherein said means for mechanically retaining comprises at least one reservoir.

8. A head stack assembly configured to pivotably mount to a disk base of a hard disk drive, comprising:
    at least one head gimbal assembly including at least one slider to be positioned over a rotating disk surface in said hard disk drive,
    with said slider comprising a deposited end including at least one means for retaining lubricant accumulating on said deposited end.

9. The head stack assembly of claim 8, wherein said deposited end further includes at least one member of the means group consisting of:
    at least one of a first means for retaining said lubricant to the left of a read-write head; and
    at least one of a second means for retaining said lubricant to the right of said read-write head.

10. The head stack assembly of claim 9, wherein at least one member of said means group includes at least one member of the group consisting of:
    a means for chemically retaining said lubricant, and
    a means for mechanically retaining said lubricant.

11. The head stack assembly of claim 10, wherein said means for mechanically retaining comprises at least one member of the group consisting of:
    a texture,
    at least one channel from an air bearing surface of said slider, and
    at least one reservoir.

12. A head gimbal assembly positioning a slider over a rotating disk surface of a hard disk drive, comprising said slider including a deposited end comprising at least one means for retaining lubricant accumulating on said deposited end.

13. The head gimbal assembly of claim 12, wherein said deposited end further includes at least one member of the means group consisting of:
    at least one of a first means for retaining said lubricant to the left of a read-write head; and
    at least one of a second means for retaining said lubricant to the right of said read-write head.

14. The head gimbal assembly of claim 13, wherein at least one member of said means group includes at least one member of the group consisting of:
    a means for chemically retaining said lubricant, and
    a means for mechanically retaining said lubricant.

15. The head gimbal assembly of claim 14, wherein said means for mechanically retaining comprises at least one member of the group consisting of:
    a texture,
    at least one channel from an air bearing surface of said slider, and
    at least one reservoir.

16. A slider for accessing a rotating disk surface in a hard disk drive, comprising:
    a deposited end including at least one means for retaining lubricant accumulating on said deposited end.

17. The slider of claim 16, wherein said deposited end further includes at least one member of the group consisting of:
    at least one of a first means for retaining said lubricant to the left of a read-write head; and
    at least one of a second means for retaining said lubricant to the right of said read-write head.

18. The slider of claim 17, wherein at least one member of said group includes a means for chemically retaining said lubricant.

19. The slider of claim 17, wherein at least one member of said group includes a means for mechanically retaining said lubricant.

20. The slider of claim 19, wherein said means for mechanically retaining comprises a texture.

21. The slider of claim 19, wherein said means for mechanically retaining comprises at least one channel from an air bearing surface of said slider.

22. The slider of claim 19, wherein said means for mechanically retaining comprises at least one reservoir.

* * * * *